(12) United States Patent
Hogan et al.

(10) Patent No.: US 7,902,278 B2
(45) Date of Patent: Mar. 8, 2011

(54) FUNCTIONALIZED POLYMERS AND IMPROVED TIRES THEREFROM

(75) Inventors: Terrence E. Hogan, Akron, OH (US); Christine Rademacher, Akron, OH (US)

(73) Assignee: Bridgestone Corporation (JP)

( * ) Notice: Subject to any disclaimer, the term of this patent is extended or adjusted under 35 U.S.C. 154(b) by 0 days.

(21) Appl. No.: 12/714,894

(22) Filed: Mar. 1, 2010

(65) Prior Publication Data

US 2010/0216910 A1  Aug. 26, 2010

Related U.S. Application Data

(63) Continuation of application No. 11/507,692, filed on Aug. 22, 2006, now Pat. No. 7,683,111.

(60) Provisional application No. 60/710,545, filed on Aug. 22, 2005, provisional application No. 60/753,207, filed on Dec. 20, 2005.

(51) Int. Cl.
  *C08K 5/34* (2006.01)
  *C08J 5/14* (2006.01)

(52) U.S. Cl. .......................................... 524/106; 523/152
(58) Field of Classification Search ................... 524/106
   See application file for complete search history.

(56) References Cited

U.S. PATENT DOCUMENTS

2006/0135701 A1 * 6/2006 Lawson et al. .............. 525/331.9

\* cited by examiner

*Primary Examiner* — David Wu
*Assistant Examiner* — Hui Chin
(74) *Attorney, Agent, or Firm* — Meredith Hooker; Arthur Reginelli

(57) ABSTRACT

A functionalized elastomer defined by the formula

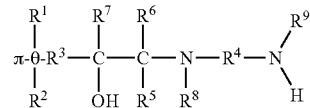

where $\pi$ includes a polymer chain, $\theta$ includes a group 14 element, $R^1$ and $R^2$ each independently include hydrogen, or a monovalent organic group, or a polymer chain, $R^3$ and $R^4$ each independently include a divalent organic group or a covalent bond, $R^5$, $R^6$, $R^7$, $R^8$ and $R^9$ each independently include a monovalent organic group or a hydrogen atom.

19 Claims, No Drawings

FUNCTIONALIZED POLYMERS AND IMPROVED TIRES THEREFROM

This application is a continuation of U.S. application Ser. No. 11/507,692, filed on Aug. 22, 2006, now U.S. Pat. No. 7,683,111 which gains the benefit of U.S. Provisional Application Ser. No. 60/753,207, filed Dec. 20, 2005, and U.S. Provisional Application Ser. No. 60/710,545, filed Aug. 22, 2005, which are incorporated herein by reference.

FIELD OF THE INVENTION

One or more embodiments are directed toward functionalized polymers and their use in the manufacture of tires.

BACKGROUND OF THE INVENTION

In the art of making tires, it may be desirable to employ rubber vulcanizates that demonstrate reduced hysteresis loss, i.e., less loss of mechanical energy to heat. Hysteresis loss can be attributed to polymer free ends within the cross-linked rubber network, as well as the disassociation of filler agglomerates. The degree of dispersion of filler within the vulcanizate can also be important, because increased dispersion may provide better wear resistance.

Functionalized polymers have been employed to reduce hysteresis loss and increase bound rubber. The functional group of the functionalized polymer is believed to reduce the number of free chain ends via interaction with filler particles. Also, this interaction can reduce filler agglomeration, which can thereby reduce hysteretic losses attributable to the disassociation of filler agglomerates (i.e., Payne effect).

Conjugated diene monomers can often be anionically polymerized by using alkyllithium compounds as initiators. Selection of certain alkyllithium compounds can provide a polymer product having functionality at the head of the polymer chain. A functional group can also be attached to the tail end of an anionically-polymerized polymer by terminating a living polymer with a functionalized compound.

For example, trialkyltin chlorides, such as tributyl tin chloride, have been employed to terminate the polymerization of conjugated dienes, as well as the copolymerization of conjugated dienes and vinyl aromatic monomers, to produce polymers having a trialkyltin functionality at the tail end of the polymer. These polymers have proven to be technologically useful in the manufacture of tire treads that are characterized by improved traction, low rolling resistance, and improved wear.

Inorganic fillers, such as silica, impart improved wet traction, rolling resistance, tear strength, snow traction and other performance parameters when used as filler within tire treads. Mixing silica into a tire stock, however, is difficult because silica particles agglomerate extensively and therefore they are not easily dispersed. In addition, silica particles are less compatible than carbon black with rubber molecules. In response, processing and dispersing aids and coupling agents are used during compounding.

SUMMARY OF THE INVENTION

One or more embodiments of the present invention provides a functionalized elastomer defined by the formula

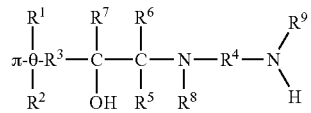

where π includes a polymer chain, θ includes a group 14 element, $R^1$ and $R^2$ each independently include hydrogen, or a monovalent organic group, or a polymer chain, $R^3$ and $R^4$ each independently include a divalent organic group or a covalent bond, $R^5$, $R^6$, $R^7$, $R^8$ and $R^9$ each independently include a monovalent organic group or a hydrogen atom.

One or more embodiments of the present invention also provides a tire component prepared by a method comprising the steps of: (i) combining (a) an elastomer including a functionalized elastomer defined by the formula:

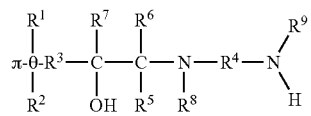

where π includes a polymer chain, θ includes a group 14 element, $R^1$ and $R^2$ each independently include hydrogen, or a monovalent organic group, or a polymer chain, $R^3$ and $R^4$ each independently include a divalent organic group or a covalent bond, $R^5$, $R^6$, $R^7$, $R^8$ and $R^9$ each independently include a monovalent organic group or a hydrogen atom with (b) a filler to form a first mixture; (ii) further mixing the first mixture, optionally with additional ingredients, to form an intermediate mixture; (iii) adding ingredients including a curative to the intermediate mixture to form a vulcanizable mixture; and (iv) fabricating the vulcanizable mixture into a tire component.

One or more embodiments of the present invention may also provide a method for preparing a tire, the method comprising the steps of: (i) combining at least one functionalized elastomer, silica, and a nitrogen-containing heterocycle, optionally with additional ingredients, to form a first mixture, where the functionalized elastomer includes a silica-interactive group and a functionality that lowers hysteresis in carbon black formulations; (ii) cooling the first mixture; (ii) further mixing the first mixture, optionally with additional ingredients including a silica coupling agent and a silica dispersing agent, to form an intermediate mixture; (iii) adding ingredients including a curative to the intermediate mixture to form a vulcanizable mixture; (iv) mixing the vulcanizable mixture; (v) forming the vulcanizable mixture into a tire component; (vi) building a tire by including the tire component; and (vii) curing the tire.

DETAILED DESCRIPTION OF ILLUSTRATIVE EMBODIMENTS

The functionalized polymers of one or more embodiments include a primary or secondary amine group and a Group 14 element at or near at least one end of a polymer chain. In one or more embodiments, the functionalized polymers are employed in the manufacture of tire treads, and as a result tires having reduced rolling resistance can be prepared.

The functionalized polymers of one or more embodiments of the present invention can be defined by the formula

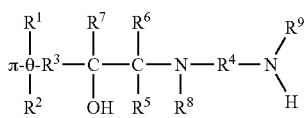

where π includes a polymer chain, θ includes a group 14 element, $R^1$ and $R^2$ each independently include a hydrogen atom, polymer chain, a monovalent organic group, $R^3$ and $R^4$ each independently include a divalent organic groups or a covalent bond, and $R^5$, $R^6$, $R^7$, $R^8$ and $R^9$ each independently include a monovalent organic group or a hydrogen atom. Group 14 elements include carbon (C), silicon (Si), germanium (Ge), tin (Sn), and lead (Pb).

In one or more embodiments, the polymer chain of the functionalized polymer includes a rubber polymer. In one or more embodiments, rubber polymers include those polymers that are capable of being vulcanized. In these or other embodiments, rubber polymers include those prepared by polymerizing conjugated diene monomer optionally together with copolymerizable monomer such as vinyl aromatic monomer. The polymer chain substituent can have a glass transition temperature ($T_g$) that is less than 0° C., in other embodiments less than −20° C., and in other embodiments less than −30° C. In one embodiment, the rubbery polymer chain exhibits a single glass transition temperature. Exemplary rubber polymers include anionically polymerized polymers. In these or other embodiments, examples include polybutadiene, polyisoprene, poly(styrene-co-butadiene), poly(styrene-co-butadiene-co-isoprene), poly(isoprene-co-styrene), and poly(butadiene-co-isoprene).

In one or more embodiments, the polymer chain has a number average molecular weight ($M_n$) of from about 5 to about 1,000 kg/mole, in other embodiments from about 50 to about 500 kg/mole, and in other embodiments from 100 to about 300 kg/mole, as measured by using Gel Permeation Chromatography (GPC) calibrated with polystyrene standards and adjusted for the Mark-Houwink constants for the polymer in question.

In one or more embodiments, the monovalent organic groups may include hydrocarbyl groups or substituted hydrocarbyl groups such as, but not limited to alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to 20 carbon atoms. These hydrocarbyl groups may contain heteroatoms such as, but not limited to, nitrogen, boron, oxygen, silicon, sulfur, and phosphorus atoms. In one or more embodiments, the monovalent organic groups will not react with a living anionic polymer.

In one or more embodiments, $R^1$ and/or $R^2$ include groups that react with or interact with silica. In one or more embodiments, $R^1$ and/or $R^2$ include an alkoxide group.

In one or more embodiments, the divalent organic group may include a hydrocarbylene group or substituted hydrocarbylene group such as, but not limited to, alkylene, cycloalkylene, substituted alkylene, substituted cycloalkylene, alkenylene, cycloalkenylene, substituted alkenylene, substituted cycloalkenylene, arylene, and substituted arylene groups, with each group preferably containing from 1 carbon atom, or the appropriate minimum number of carbon atoms to form the group, up to about 20 carbon atoms. Substituted hydrocarbylene group includes a hydrocarbylene group in which one or more hydrogen atoms have been replaced by a substituent such as an alkyl group. The divalent organic groups may also contain one or more heteroatoms such as, but not limited to, nitrogen, oxygen, boron, silicon, sulfur, and phosphorus atoms. In one or more embodiments, the divalent organic group will not react with a living anionic polymer.

In one or more embodiments, the functionalized polymer may include a functional group at the head of the polymer; i.e., at an end other than that including the amine. This functionalized polymer can be defined by the formula II

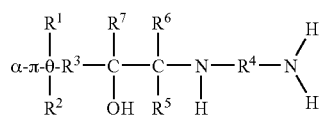

where α is a functionality or functional group that has a desirable impact on filled rubber compositions or vulcanizates, and π, θ, $R^1$, $R^2$, $R^3$, $R^4$, $R^5$, $R^6$, and $R^7$ are as described above.

In one or more embodiments, functionalities or functional groups that have a desirable impact on filled rubber compositions or vulcanizates include those groups or substituents that react or interact with rubber or fillers employed in rubber compositions. In one or more embodiments, functional groups include those substituents that reduce the 50° C. hysteresis loss of a carbon black-filled vulcanizate as compared to similar carbon black-filled vulcanizates without the functional group. In one or more embodiments, this reduction in hysteresis loss is at least 5%, in other embodiments at least 10%, and in other embodiments at least 15%. In other embodiments, functional groups include those groups that will have a similar impact on silica-filled or mixed carbon black/silica-filled compositions. In one or more embodiments, the functional groups include a heteroatom. These hetero atom-bearing substituents include those that may generally be characterized as an electron rich species or metal-containing species. Functional groups include those substituents that react or interact with rubber or rubber fillers or otherwise have a desirable impact on filled rubber compositions or vulcanizates.

Numerous functional groups are known in the art. Exemplary functional groups include tin-containing groups, nitrogen-containing groups, boron-containing groups, oxygen-containing groups, phosphorous-containing groups, and sulfur-containing groups. Exemplary tin-containing groups include trialkyltin groups such as tributyl tin and trioctyltin groups. Exemplary nitrogen-containing groups include cyclic amine groups such as hexamethyleneimine groups, pyrollidine groups, and aziridine groups. Exemplary sulfur-containing groups include sulfur-containing azaheterocycle groups, and dithiane groups. Exemplary oxygen-containing groups include carbonyl-containing groups, oxygen-containing and azaheterocycle.

Exemplary phosphorous-containing functionalized polymers are disclosed in U.S. Pat. No. 4,485,833; exemplary oxygen-containing azaheterocycle functionalized polymers are disclosed in U.S. Pat. No. 6,596,798; exemplary oxygen-containing and sulfur-containing heterocycle functionalized polymers are disclosed in International Publication Nos. WO 2004/020475; exemplary trialkyl tin substituent functionalized polymers are disclosed in U.S. Pat. No. 5,268,439; exemplary cyclic amine functionalized polymers are disclosed in U.S. Pat. Nos. 6,080,853, 5,786,448, 6,025,450, and 6,046,288; exemplary aryl or alkyl thio acetal (e.g., dithianes) functionalized polymers are disclosed in International Publication No. WO 2004/041870, all of which are incorporated herein by reference.

In one or more embodiments, the functionalized polymers of this invention may be prepared by reacting or terminating a living polymer with a functionalized epoxide compound to form a precursor compound, and then reacting the precursor compound with a diamine.

In one or more embodiments, the functionalized epoxide compound may be defined by the formula

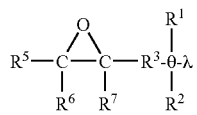

where $R^1$ and $R^2$ are each independently hydrogen, or a monovalent organic group, $R^3$ is a divalent organic group or a covalent bond, $R^5$, $R^6$, and $R^7$ each independently include a monovalent organic group or a hydrogen atom, θ is a Group 14 element, and λ includes a leaving group or an addition group. In one or more embodiments, at least one of $R^1$ and $R^2$ include a group or substituent that results or interacts with silica. In one or more embodiments, at least one of $R^1$ or $R^2$ are alkoxide group.

In one or more embodiments, leaving groups include those substituents that can be displaced by a nucleophilic compound. In one or more embodiments, leaving groups include those substituents that will react or associate with the countercation of a living polymer (e.g., $Li^+$) and thereby form a stable or neutral compound. Exemplary leaving groups, or groups that include leaving groups, include halides, thioalkoxides, alkoxides, dialkylamines, and mixtures thereof. Examples of alkoxide groups include methoxy and ethoxy groups. Leaving groups include cyclic leaving groups, which can be self-contained (i.e., the group opens).

In one or more embodiments, addition groups include those substituents that will undergo an addition reaction with a nucleophilic compound. In one or more embodiments, the addition group will react or associate with the living anionic portion (e.g., —C⁻) of a living polymer. In one or more embodiments, addition groups include nitriles such as cyano groups, alkyl or alkenyl nitriles, Schiff bases (e.g., RR'C=NR"), ketone groups, aldehyde groups, or ester groups.

Examples of functionalized epoxide compounds include 3-(glycidoxypropyl) trimethoxysilane, 3-(glycidoxypropyl) triethoxysilane epichlorohydrin, ethylene glycol diglycidyl ether, trimethylol ethane triglycidyl ether, ethyl 2,3-epoxy-buryrate, ethyl 2,3-epoxy-3-methylvalerate, and methyl 3-sec-butyl-3-methylglycidate, 'γ-glycidoxybutyltr-imethoxysilane, γ-glycidoxypropyltriethoxysilane, γ-glycidoxypropyltripropoxysilane and γ-glycidoxypropyltribut-oxysilane, γ-glycidoxypropyltriphenoxysilane, γ-glycidoxypropylmethyldim-ethoxysilane, γ-glycidoxypropylethyldimethoxysilane, γ-glycidoxypropylethyldiethoxysilane, γ-glycidoxypropylmethyl-diethoxysilane, γ-glycidoxypropylmethyldipropoxysilane, γ-glycidoxypropylmethyldibutoxysilane, γ-glycidoxypropylmethy-ldiphenoxysilane, γ-glycidoxypropyldimethylmethoxysilane, γ-glycidoxypropyldiethylethoxysilane and γ-glycidoxypropyldim-ethylethoxysilane, γ-glycidoxypropyldimethylphenoxysilane, γ-glycidoxypropyldiet-hyl-methoxysilane, γ-glycidoxypropylmethyldiiso-propeneoxysilane, bis(γ-glycidoxypropyl)dimethoxysilane, bis(γ-glycidoxypropyl)-diethoxysilane, bis (γ-glycidoxypropyl)dipropoxysilane, bis(γ-glycidoxypropyl)dibutoxysilane, bis(γ-glycidoxypropyl) d-iphenoxysilane, bis(γ-glycidoxypropyl)methylmethoxysilane and bis(γ-glycidoxypropyl) methylethoxysilane, bis(γ-glycidoxypropyl)methylpropoxysilane, bis(γ-glycidoxypro-pyl)methylbutoxysilane, bis (γ-glycidoxypropyl)methylphenoxysilane, tris(γ-glycidoxypropyl)methoxysilane, γ-methacryloxypropyltri-methoxysilane, γ-methacryloxypropyltriethoxysilane, γ-methacryloxymethyltrimethoxysilane, γ-methacryloxyeth-yltrie-thoxysilane, bis(γ-methacryloxypropyl)dimethoxysilane, tris(γ-methacryloxypropyl) methoxysilane, β-(3,4-epoxycyclohexy-1)ethyl-trimethoxysilane and β-(3,4-epoxycyclohexyl) ethyl-triethoxysi-lane, β-(3,4-epoxycyclohexyl)ethyl-tripropoxysilane, β-(3,4-epoxycyclohexyl)ethyl-tributoxysilane, β-(3,4-epoxycyclohexyl)ethyl-triphenoxysilane, β-(3,4-epoxycyclohexyl)propyl-trimethoxysilane, β-(3,4-epoxycyclohexyl)ethyl-methyldimethoxysilane, β-(3,4-epoxycyclohexyl)ethyl-ethyldimethoxysilane, β-(3,4-epoxycyclohexyl)ethyl-ethyldiethoxysilane, β-(3,4-epoxycyclohexyl)ethyl-methyldiethoxysilane, β-(3,4-epoxycyclohexyl)ethyl-methyldipropoxysilane and β-(3,4-epoxycyclohexyl)ethyl-methyldibutoxysilane.

In one or more embodiments, the diamine compound may be defined by the formula

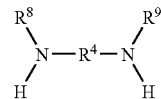

where $R^8$ and $R^9$ each independently include a monovalent organic group or a hydrogen atom, and $R^4$ includes a divalent organic group.

Exemplary diamines include hexamethylenediamine, p-phenylenediamine, 4-diaminobutane, 1,4-diaminocyclohexane, 1,2-diaminocyclohexane, and 1,3-diaminocyclohexane.

In one or more embodiments, living polymers include anionically polymerized polymers (i.e., polymers prepared by anionic polymerization techniques). Anionically-polymerized living polymers may be formed by reacting anionic initiators with certain unsaturated monomers to propagate a polymeric structure. Throughout formation and propagation of the polymer, the polymeric structure may be anionic and "living." A new batch of monomer subsequently added to the reaction can add to the living ends of the existing chains and increase the degree of polymerization. A living polymer, therefore, includes a polymeric segment having a living or reactive end. Anionic polymerization is further described in George Odian, *Principles of Polymerization*, ch. 5 ($3^{rd}$ Ed. 1991), or Panek, 94 J. Am. Chem. Soc., 8768 (1972), which are incorporated herein by reference.

Monomers that can be employed in preparing an anionically polymerized living polymer include any monomer capable of being polymerized according to anionic polymerization techniques. These monomers include those that lead to the formation of elastomeric homopolymers or copolymers. Suitable monomers include, without limitation, conjugated $C_4$-$C_{12}$ dienes, $C_8$-$C_{18}$ monovinyl aromatic monomers, and $C_6$-$C_{20}$ trienes. Examples of conjugated diene monomers include, without limitation, 1,3-butadiene, isoprene, 1,3-pentadiene, 2,3-dimethyl-1,3-butadiene, and 1,3-hexadiene. A non-limiting example of trienes includes myrcene. Aromatic vinyl monomers include, without limitation, styrene, α-methyl styrene, p-methylstyrene, and vinylnaphthalene. When preparing elastomeric copolymers, such as those containing conjugated diene monomers and aromatic vinyl monomers, the conjugated diene monomers and aromatic vinyl monomers are normally used at a ratio of 95:5 to 50:50, and preferably 95:5 to 65:35.

Any anionic initiator can be employed to initiate the formation and propagation of the living polymers. Exemplary anionic initiators include, but are not limited to, alkyl lithium initiators such as n-butyl lithium, arenyllithium initiators, arenylsodium initiators, aminoalkyllithiums, and alkyl tin lithiums. Other useful initiators include N-lithiohexamethyleneimide, N-lithiopyrrolidinide, and N-lithiododecamethyleneimide as well as organolithium compounds such as the tri-alkyl lithium adducts of substituted aldimines and substituted ketimines, and N-lithio salts of substituted secondary amines. Still others include alkylthioacetals (e.g., dithianes). Exemplary initiators are also described in the following U.S. Pat. Nos. 5,332,810, 5,329,005, 5,578,542, 5,393,721, 5,698,646, 5,491,230, 5,521,309, 5,496,940, 5,574,109, 5,786,441, and International Publication Nos. WO 2004/020475 and WO 2004/041870, which are incorporated herein by reference.

The amount of initiator employed in conducting anionic polymerizations can vary widely based upon the desired polymer characteristics. In one or more embodiments, from about 0.1 to about 100, and optionally from about 0.33 to about 10 mmol of lithium per 100 g of monomer is employed.

Anionic polymerizations are typically conducted in a polar solvent such as tetrahydrofuran (THF) or a nonpolar hydrocarbon such as the various cyclic and acyclic hexanes, heptanes, octanes, pentanes, their alkylated derivatives, and mixtures thereof, as well as benzene.

In order to promote randomization in copolymerization and to control vinyl content, a polar coordinator may be added to the polymerization ingredients. Amounts range between 0 and 90 or more equivalents per equivalent of lithium. The amount depends on the amount of vinyl desired, the level of styrene employed and the temperature of the polymerization, as well as the nature of the specific polar coordinator (modifier) employed. Suitable polymerization modifiers include, for example, ethers or amines to provide the desired microstructure and randomization of the comonomer units.

Compounds useful as polar coordinators include those having an oxygen or nitrogen heteroatom and a non-bonded pair of electrons. Examples include dialkyl ethers of mono and oligo alkylene glycols; "crown" ethers; tertiary amines such as tetramethylethylene diamine (TMEDA); linear THF oligomers; and the like. Specific examples of compounds useful as polar coordinators include tetrahydrofuran (THF), linear and cyclic oligomeric oxolanyl alkanes such as 2,2-bis (2'-tetrahydrofuryl) propane, di-piperidyl ethane, dipiperidyl methane, hexamethylphosphoramide, N—N'-dimethylpiperazine, diazabicyclooctane, dimethyl ether, diethyl ether, tributylamine and the like. The linear and cyclic oligomeric oxolanyl alkane modifiers are described in U.S. Pat. No. 4,429,091, incorporated herein by reference.

Anionically polymerized living polymers can be prepared by either batch or continuous methods. A batch polymerization is begun by charging a blend of monomer(s) and normal alkane solvent to a suitable reaction vessel, followed by the addition of the polar coordinator (if employed) and an initiator compound. The reactants are heated to a temperature of from about 20 to about 130° C. and the polymerization is allowed to proceed for from about 0.1 to about 24 hours. This reaction produces a reactive polymer having a reactive or living end. Preferably, at least about 30% of the polymer molecules contain a living end. More preferably, at least about 50% of the polymer molecules contain a living end. Even more preferably, at least about 80% contain a living end.

In one or more embodiments, the reaction between the functionalized epoxide and the living polymer can be achieved by simply mixing the functionalized epoxide with the living polymer. Without intending to be bound to any particular theory, it is believed that the anionic-living polymer reacts with the leaving group or addition group via a nucleophilic substitution or addition reaction. In one or more embodiments, the reaction between the functionalized epoxide and the living polymer results in the formation of a precursor compound that includes an epoxide group. Those skilled in the art appreciate that some of the reaction product may not include an epoxide group inasmuch as the living polymer anion may likewise react with the functionalized epoxide at the epoxide functionality, thereby causing a ring opening reaction, which transforms the epoxide functionality. While this might be a byproduct of the reaction between the functionalized epoxide compound and the living polymer, the formation of the precursor compound including an epoxide functionality likewise results.

In one embodiment, the functionalized epoxide may be added to the living polymer cement (i.e., polymer and solvent) once a peak polymerization temperature, which is indicative of nearly complete monomer conversion, is observed. Because live ends may self-terminate, the functionalized epoxide may be added within about 25 to 35 minutes of the peak polymerization temperature.

The amount of functionalized epoxide employed to prepare the functionalized polymers can be described with respect to the equivalents of lithium or metal cation associated with the initiator, which can be related to the moles of living polymer (i.e., polymer anions). In one or more embodiments, the moles of functionalized epoxide to lithium (or moles of polymer anion) can be from about 0.25:1 to about 10:1, in other embodiments from about 1:1 to about 5:1, and in other embodiments from about 1.2:1 to about 2:1. In one or more embodiments, a molar excess of functionalized epoxide to lithium is employed.

In one or more embodiments, the precursor compound including the epoxide group or functionality may be reacted with a diamine by simply mixing the diamine with the precursor compound. Without intending to be bound to any particular theory, it is believed that the amine substituent reacts with the epoxide group of the precursor via a ring opening reaction. As a result, a polymer bearing a primary amine is formed.

The reaction between the functionalized epoxide compound and the living polymer may take place within a solvent including those solvents employed in the preparation of the living polymer. Likewise, the reaction between the precursor compound bearing the epoxide substituent and the diamine can take place in a solvent including those solvents employed in the preparation of the living polymer. In one or more embodiments, the reaction between the functionalized epoxide and the living polymer, as well as the reaction between the precursor and the diamine, can take place under standard conditions of temperature and pressure. In one or more embodiments, the reaction may take place at a temperature of from about 0° C. to about 150° C., and in other embodiments from about 23° C. to about 80° C. Also, in one or more embodiments, these reactions may take place under an inert atmosphere.

In one or more embodiments, the reaction between the precursor compound and the diamine can take place immediately following the reaction between the living polymer and functionalized epoxide compound. Although the precursor compound, under an inert atmosphere, is substantially stable, and therefore the precursor can be stored. In one or more embodiments, there may be a delay between the reaction or formation of the precursor compound and reaction with the diamine.

After formation of the functional polymer, a processing aid and other optional additives such as oil can be added to the polymer cement. The functional polymer and other optional ingredients may then be isolated from the solvent and optionally dried. Conventional procedures for desolventization and drying may be employed. In one embodiment, the functional polymer may be isolated from the solvent by steam desolventization or hot water coagulation of the solvent followed by filtration. Residual solvent may be removed by using conventional drying techniques such as oven drying or drum drying. Alternatively, the cement may be directly drum dried.

The functionalized polymers of this invention are particularly useful in preparing tire components. These tire components can be prepared by using the functionalized polymers of this invention alone or together with other rubbery polymers. Other rubbery polymers that may be used include natural and synthetic elastomers. The synthetic elastomers typically derive from the polymerization of conjugated diene monomers. These conjugated diene monomers may be copolymerized with other monomers such as vinyl aromatic monomers. Other rubbery elastomers may derive from the polymerization of ethylene together with one or more α-olefins and optionally one or more diene monomers.

Useful elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly (isoprene-co-butadiene), poly (ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. Other ingredients that are typically employed in rubber compounding may also be added.

The rubber compositions may include fillers such as inorganic and organic fillers. The organic fillers include carbon black and starch. The inorganic fillers may include silica, aluminum hydroxide, magnesium hydroxide, clays (hydrated aluminum silicates), and mixtures thereof. Silica (silicon dioxide) includes wet-process, hydrated silica produced by a chemical reaction in water, and precipitated as ultra-fine spherical particles. In one embodiment, the silica has a surface area of about 32 to about 400 m$^2$/g, in another embodiment about 100 to about 250 m$^2$/g, and in yet another embodiment, about 150 to about 220 m$^2$/g. The pH of the silica filler in one embodiment is about 5.5 to about 7 and in another embodiment about 5.5 to about 6.8. Commercially available silicas include Hi-Sil™ 215, Hi-Sil™ 233, Hi-Sil™ 255LD, and Hi-Sil™ 190 (PPG Industries; Pittsburgh, Pa.), Zeosil™ 1165 MP and 175GRPlus (Rhodia), Vulkasil™ S/kg (Bary AG), Ultrasil™ VN2, VN3 (Degussa), and HuberSil™ 8745 (Huber).

In one embodiment, silica may be used in an amount of from about 5 to about 100 parts by weight parts per hundred rubber (phr), in another embodiment from about 10 to about 90 parts by weight phr, in yet another embodiment from about 15 to about 80 parts by weight phr, and in still another embodiment from about 25 to about 75 parts by weight phr.

A multitude of rubber curing agents may be employed, including sulfur or peroxide-based curing systems. Curing agents are described in Kirk-Othmer, ENCYCLOPEDIA OF CHEMICAL TECHNOLOGY, Vol. 20, pgs. 365-468, (3$^{rd}$ Ed. 1982), particularly *Vulcanization Agents and Auxiliary Materials*, pgs. 390-402, and A. Y. Coran, *Vulcanization*, ENCYCLOPEDIA OF POLYMER SCIENCE AND ENGINEERING, (2$^{nd}$ Ed. 1989), which are incorporated herein by reference. Vulcanizing agents may be used alone or in combination. In one or more embodiments, the preparation of vulcanizable compositions and the construction and curing of the tire is not affected by the practice of this invention.

Other ingredients that may be employed include accelerators, oils, waxes, scorch inhibiting agents, processing aids, zinc oxide, tackifying resins, reinforcing resins, fatty acids such as stearic acid, peptizers, and one or more additional rubbers.

These stocks are useful for forming tire components such as treads, subtreads, black sidewalls, body ply skins, bead filler, and the like. Preferably, the functional polymers are employed in tread formulations. In one or more embodiments, these tread formulations may include from about 10 to about 100% by weight, in other embodiments from about 35 to about 90% by weight, and in other embodiments from about 50 to 80% by weight of the functional polymer based on the total weight of the rubber within the formulation.

In one or more embodiments, the vulcanizable rubber composition may be prepared by forming an initial masterbatch that includes the rubber component and filler (the rubber component optionally including the functionalized polymer of this invention). This initial masterbatch may be mixed at a starting temperature of from about 25° C. to about 125° C. with a discharge temperature of about 135° C. to about 180° C. To prevent premature vulcanization (also known as scorch), this initial masterbatch may exclude vulcanizing agents. Once the initial masterbatch is processed, the vulcanizing agents may be introduced and blended into the initial masterbatch at low temperatures in a final mix stage, which preferably does not initiate the vulcanization process. Optionally, additional mixing stages, sometimes called remills, can be employed between the masterbatch mix stage and the final mix stage. Various ingredients including the functionalized polymer of this invention can be added during these remills. Rubber compounding techniques and the additives employed therein are generally known as disclosed in *The Compounding and Vulcanization of Rubber*, in *Rubber Technology* (2$^{nd}$ Ed. 1973).

The mixing conditions and procedures applicable to silica-filled tire formulations are also well known as described in U.S. Pat. Nos. 5,227,425, 5,719,207, 5,717,022, and European Patent No. 890,606, all of which are incorporated herein by reference. In one or more embodiments, where silica is employed as a filler (alone or in combination with other fillers), a coupling and/or shielding agent may be added to the rubber formulation during mixing. Useful coupling and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172, 5,696,197, 6,608,145, 6,667,362, 6,579,949, 6,590,017, 6,525,118, 6,342,552, and 6,683,135, which are incorporated herein by reference. In one embodiment, the initial masterbatch is prepared by including the functionalized polymer of this invention and silica in the substantial absence of coupling and shielding agents. It is believed that this procedure will enhance the opportunity that the functionalized polymer will react or interact with silica before competing with coupling or shielding agents, which can be added later during remills.

In certain embodiments, where silica filler is employed to make the rubber compositions, the compositions are prepared by mixing the functionalized polymer and silica in the presence of a nitrogen-containing heterocycle. The nitrogen-containing heterocycle is believed to enhance the reaction or interaction between the silica and the functionalized polymer, particularly the group 14 element and/or its adjacent substituents.

In one or more embodiments, nitrogen-containing heterocycles include substituted and unsubstituted nitrogen-containing heterocycles. The nitrogen-containing heterocycle may be aromatic or non-aromatic. Nitrogen-containing heterocycles may include compounds defined by the formula

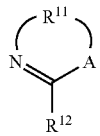

where A includes oxygen, sulfur, or N—$R^{13}$, $R^{11}$ includes a divalent organic group, $R^{12}$ and $R^{13}$ independently include a hydrogen atom or a monovalent organic group, or where any two or more of $R^{11}$, $R^{12}$, and $R^{13}$ combine to form a multivalent organic group, which results in a multicyclic compound. In one embodiment, A is nitrogen. In this or other embodiments, the nitrogen-containing heterocycle includes a nitrogen-containing ring having from 5 to 9 ring members (i.e., 5 to 9 atoms in the ring). In one embodiment, the ring has 5 ring members. Nitrogen-containing heterocycles are further described in co-pending U.S. application Ser. No. 11/259,485, which is incorporated herein by reference.

In one or more embodiments, nitrogen-containing heterocycles include imidazoles, pyrimidines, thiazoles, thiazolines, histadine, purines, adenines, and guanines.

In one embodiment, the nitrogen-containing heterocycle is a substituted or unsubstituted imidazole, which may be represented by the formula

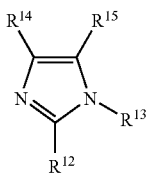

where $R^{12}$, and $R^{13}$ are as described above, and $R^{14}$ and $R^{15}$ independently include a hydrogen atom or a monovalent organic group, or where any two or more of $R^{12}$, $R^{13}$, $R^{14}$, or $R^{15}$ combine to form a multivalent organic group, which results in a multicyclic compound.

Examples of imidazoles include imidazole, 4-ethylamino imidazole, 2-mercapto-1-methyl imidazole, 1-methyl imidazole, 2,4,5-triphenyl imidazole, 2-methyl imidazole, 2-ethyl-4-methyl imidazole, and 2-heptadecyl imidazole.

The amount of nitrogen-containing heterocycle employed is not particularly limited, but is, in one embodiment, from about 0.005 to about 8 percent by weight based on the weight of the functionalized polymer, in another embodiment, from about 0.05 to about 5 percent by weight based on the weight of the functionalized polymer, in yet another embodiment, from about 0.01 to about 3 percent by weight based on the weight of the functionalized polymer, and in still another embodiment, from about 0.1 to about 2 percent by weight based on the weight of the functionalized polymer.

In one or more embodiments, it has been discovered that mixing functionalized polymer that includes both a silica interactive group and a carbon black interactive group in the presence of a nitrogen-containing heterocycle provides advantageous results. Polymers that include both silica interactive groups and carbon black interactive groups include the functionalized polymers disclosed herein as well as those disclosed in U.S. Publication No. 2006/0135701 A1, which is incorporated herein by reference.

Where the vulcanizable rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it may be heated to about 140 to about 180° C. Cured or crosslinked rubber compositions may be referred to as vulcanizates, which generally contain three-dimensional polymeric networks that are thermoset. The other ingredients, such as processing aides and fillers, may be evenly dispersed throughout the vulcanized network. Pneumatic tires can be made as discussed in U.S. Pat. Nos. 5,866,171, 5,876,527, 5,931,211, and 5,971,046, which are incorporated herein by reference.

In order to demonstrate the practice of the present invention, the following examples have been prepared and tested. The examples should not, however, be viewed as limiting the scope of the invention. The claims will serve to define the invention.

EXAMPLES

Experiment 1

A living polymer cement was prepared by charging a 5-gallon reactor with 4.91 kg of technical hexanes, 1.25 g of a 32.8% solution of styrene/hexane blend, and 7.37 kg of a 22% 1,3-butadiene/hexane blend. 2,2-bis(2'-tetra hydrofuryl)propane polar randomizer (about 0.3 equivalents per equivalent of lithium) and n-butyllithium initiator (11.60 mL of a 1.6 molar solution) were subsequently charged. The reactor was heated in batch mode to 49° C. The reaction exothermed to 65° C. within 30 minutes and batch was cooled to about 32° C. after one hour. The resulting cement was then apportioned to bottles that were dried, nitrogen purged, and ultimately capped for subsequent reaction.

Experiment 2

A bottle prepared from the batch of Experiment 1 was employed to form a functionalized polymer. Specifically, 1.0 mole of 3-(glycidoxypropyl) trimethoxysilane per equivalent of lithium was added to the bottle and the bottle was then agitated for 30 minutes at 50° C. At this point, 1 mole of hexamethylenediamine was added per equivalent of lithium. This reaction mixture was agitated for an additional 30 minutes at 50° C. The functionalized polymer was then coagulated in isopropyl alcohol and drum dried. The isolated polymer had the following properties: $M_n$=191 kg/mol; $M_w/M_n$=1.39; and $T_g$=−33.2° C., and was 74% coupled. This functionalized polymer has been designed Sample II.

Experiment 3

A second bottle prepared from the batch of Experiment 1 was employed to form a functionalized polymer. Specifically, 1.0 mole of 3-(glycidoxypropyl) trimethoxysilane per equivalent of lithium was added to the bottle and the bottle was then agitated for 30 minutes at 50° C. At this point, 1 mole of ethylenediamine was added per equivalent of lithium. This reaction mixture was agitated for an additional 30 minutes at 50° C. The functionalized polymer was then coagulated in isopropyl alcohol and drum dried. The isolated polymer had the following properties: $M_n$=134 kg/mol; $M_w/M_n$=1.53; $T_g$=−33° C., and was 61% coupled. This functionalized polymer has been designed Sample III.

Experiment 4

A third bottle prepared from the batch of Experiment 1 was employed to form a functionalized polymer. Specifically, 1.0 mole of 3-(glycidoxypropyl) trimethoxysilane per equivalent of lithium was added to the bottle and the bottle was then agitated for 30 minutes at 50° C. At this point, 1 mole of diethylene triamine was added per equivalent of lithium. This reaction mixture was agitated for an additional 30 minutes at 50° C. The functionalized polymer was then coagulated in isopropyl alcohol and drum dried. The isolated polymer had the following properties: $M_n$=193 kg/mol; $M_w/M_n$=1.39; $T_g$=−33° C., and was 77% coupled. This functionalized polymer has been designed Sample W.

Experiment 5

The functionalized polymers prepared above were each employed to prepare separate tire formulations that included either a carbon black reinforcement or a silica and carbon black blend reinforcement. The recipes for the tire formulations are set forth in Table I.

TABLE I

| Ingredient | Carbon Black Formulation (phr) | Mixed Silica Formulation (phr) |
|---|---|---|
| Functionalized Polymer | 100 | 100 |
| Carbon Black | 55 | 35 |
| Silica | — | 30 |
| Antiozonant | 0.95 | 0.95 |
| Zinc Oxide | 2.5 | 2.5 |
| Stearic Acid | 2 | 1.5 |
| Oil | 10 | 10 |
| Wax | 1 | 1.03 |
| Coupling Agent | — | 2.74 |
| Binder | — | 0.8 |
| Sulfur | 1.3 | 1.7 |
| Accelerator | 1.9 | 2.0 |
| Scorch Inhibitor | — | 0.25 |

The tire formulations were mixed using conventional mixing procedures. Namely, when preparing formulations that included carbon black reinforcement, the ingredients (excluding the sulfur and accelerators) were initially mixed at about 134° C. and the sulfur and accelerators were subsequently added in a separate mixing step that was conducted at about 63° C. Where the formulations included both carbon black and silica, the ingredients (excluding sulfur, accelerators, binder, coupling agents, and wax) were mixed at about 168° C., the coupling agent was subsequently added and mixed at about 137° C., and the sulfur, accelerators, and wax were added in a subsequent mixing step and mixed at about 95° C.

The formulations were then prepared into test specimens and cured within a closed cavity mold under pressure for 15 minutes at 171° C. The test specimens were then subjected to various physical tests, and the results of these tests are reported in Table II for the formulations that exclusively included carbon black as a reinforcement and in Table III for the formulations that included a carbon black/silica blend. The formulation numbers set forth in Tables II and III correspond to the Sample numbers of the functionalized polymers above, and those employed in carbon black recipes include the designation "A" and those employed in carbon black/silica formulations include the designation "B."

TABLE II

| Formulation | 2A | 3A | 4A |
|---|---|---|---|
| $ML_{1+4}$ @ 130° C. | 61.73 | 45.85 | 61.84 |
| 300% Modulus @ 23° C. (MPa) | 12.97 | 11.48 | 13.06 |
| Tensile Strength @ 23° C. (MPa) | 20.29 | 17.71 | 18.9 |
| Temperature Sweep 0° C. tan δ | 0.287 | 0.282 | 0.284 |
| Temperature Sweep 50° C. tan δ | 0.228 | 0.232 | 0.224 |
| ΔG' (MPa) | 2.5095 | 1.258 | 2.5663 |
| 50° C. RDA Strain sweep (5% strain) tan δ | 0.191 | 0.168 | 0.186 |
| Bound Rubber (%) | 27.4 | 29.9 | 28.8 |

TABLE III

| Formulation | 2B | 3B | 4B |
|---|---|---|---|
| $ML_{1+4}$ @ 130° C. | 96.8 | 100.8 | 98.9 |
| 300% Modulus @ 23° C. (MPa) | 11.9 | 11.7 | 11.8 |
| Tensile Strength @ 23° C. (MPa) | 16.3 | 13.7 | 15.4 |
| Temperature Sweep 0° C. tan δ | 0.305 | 0.296 | 0.303 |
| Temperature Sweep 50° C. tan δ | 0.189 | 0.177 | 0.187 |
| ΔG' (MPa) | 1.93 | 2.43 | 2.11 |
| 50° C. RDA Strain sweep (5% strain) tan δ | 0.159 | 0.176 | 0.169 |
| Bound Rubber (%) | 72.7 | 81.3 | 73.5 |

Mooney viscosity measurement was conducted at 130° C. using a large rotor. The Mooney viscosity was recorded as the torque when the rotor has rotated for 4 minutes. The sample is preheated at 130° C. for 1 minute before the rotor starts.

The bound rubber content test was used to determine the percent of polymer bound to filler particles in tire tread stocks. Bound rubber was measured by immersing small pieces of uncured stocks in a large excess of toluene for three days. The soluble rubber was extracted from the sample by the solvent. After three days, any excess toluene was drained off and the sample was air dried and then dried in an oven at approximately 100° C. to a constant weight. The remaining pieces form a weak coherent gel containing the filler and some of the original rubber. The amount of rubber remaining with the filler is the bound rubber. The bound rubber content is then calculated according to the following:

$$\% \text{ Bound Polymer} = \frac{100(Wd - F)}{R} \quad (1)$$

where Wd is the weight of dried gel, F is the weight of filler in gel or solvent insoluble matter (same as weight of filler in original sample), and R is the weight of polymer in original sample.

The tensile mechanical properties were measured using the standard procedure described in the ASTM-D 412 at 25° C. and 100° C. The tensile test specimens had dumbbell shapes with a thickness of 1.9 mm. A specific gauge length of 25.4 mm is used for the tensile test. Heat aged data was obtained after heating the vulcanizates for 24 hours at 100° C.

Temperature sweep experiments were conducted with a frequency of 31.4 rad/sec using 0.5% strain for temperature ranging from −100° C. to −10° C., and 2% strain for the temperature ranging from −10° C. to 100° C. ΔG is the change in G' at 0.25% form G' at 14.75%. Payne effect (ΔG') data were obtained from the strain sweep experiment. A frequency of 3.14 rad/sec was used for strain sweep which is conducted at 50° C. with strain sweeping from 0.25% to 14.75%.

Experiment 6

A living polymer cement was prepared by charging a 19-liter reactor with 4.9 kg of technical hexanes, 1.25 kg of a 32.8% solution of styrene/hexane blend, and 7.37 kg of a 22% 1,3-butadiene/hexane blend. A polar randomizer, 2,2-bis(2'-tetrahydrofuryl)propane (about 0.3 equivalents per equivalent of lithium), and n-butyllithium initiator (11.6 mL of a 1.6 molar solution) were subsequently charged. The reactor was heated in batch mode to 50° C. The reaction exothermed to 65° C. within 30 minutes and batch was cooled to about 32° C. after one hour. A portion of the cement was coagulated in isopropyl alcohol and drum dried. This polymer has been designated Sample 1, and properties are listed in Table I. The remaining cement was then apportioned to bottles that were dried, nitrogen purged, and ultimately capped for subsequent reaction.

Experiment 7

A bottle prepared from the batch of Experiment 6 was employed to form a functionalized polymer. Specifically, 1.0 mole of 3-(glycidoxypropyl) trimethoxysilane per equivalent of lithium was added to the bottle and the bottle was then agitated for 30 minutes at 50° C. At this point, 1 mole of hexamethylenediamine was added per equivalent of lithium. This reaction mixture was agitated for an additional 30 minutes at 50° C. The functionalized polymer was then coagulated in isopropyl alcohol and drum dried, and the characteristics of the polymer and set forth in Table IV.

TABLE IV

| | Sample 1 | Sample 2 |
|---|---|---|
| $M_n$ (kg/mol) | 104 | 191 |
| $M_w/M_n$ (kg/mol) | 1.05 | 1.39 |
| $ML_{1+4}$@100° C. | 9.1 | n/a |
| $T_g$ (° C.) | −33.2 | −33.4 |

Experiments 8

The functionalized polymer prepared in Experiment 7 was employed in carbon black/silica tire formulations. The formulations are presented in Table V. More specifically, functionalized polymer was present in Formulations 2 and 3, and imidazole was present in Formulation 3.

TABLE V

| Formulation | 1 | 2 | 3 |
|---|---|---|---|
| Initial (parts by weight) | | | |
| Isopropanol-terminated SBR | 100 | — | — |
| Functionalized SBR | — | 100 | 100 |
| Imidazole | — | — | 2 |
| Carbon Black* | 35 | 35 | 35 |
| Silica | 30 | 30 | 30 |
| Antioxidant | 0.95 | 0.95 | 0.95 |
| Aromatic Oil | 10 | 10 | 10 |
| Stearic acid | 1.5 | 1.5 | 0.50 |

TABLE V-continued

| Formulation | 1 | 2 | 3 |
|---|---|---|---|
| Second (parts by weight) | | | |
| Disulfane | 4.57 | 4.57 | 4.57 |
| Final (parts by weight) | | | |
| Sulfur | 1.7 | 1.7 | 1.7 |
| Zinc Oxide | 2.5 | 2.5 | 2.5 |
| Accelerators | 2.0 | 2.0 | 2.0 |
| PVI | 0.25 | 0.25 | 0.25 |

*SAF
**60% on 22.5% wax and 17.5% binder

Each carbon black/silica rubber formulation was prepared in three stages named Initial Masterbatch, Second Masterbatch, and Final. In the initial stage, isopropanol-terminated or dual-functionalized SBR was mixed with silica, carbon black, imidazole, oil and antioxidant as listed in Table V in a 65 g Banbury mixer operating at 60 rpm and initially at about 133° C. After about 3 minutes, stearic acid was added. The initials were mixed for 5-6 minutes. At the end of the mixing the temperature was approximately 165° C. The samples were cooled to less than about 60° C., sheeted and cooled to room temperature. This initial masterbatch was and transferred to a remill mixer.

In the second masterbatch stage, the initial composition was mixed with disulfane at about 60 rpm. The starting temperature of the mixer was about 95° C. The remill material was removed from the mixer after about 3 minutes, when the material temperature was about 145° C. The second masterbatch was cooled to about 60° C., sheeted and cooled to room temperature.

The finals were mixed by adding the second masterbatch compositions, curative materials, and other ingredients as listed in Table V to the mixer simultaneously. The starting mixer temperature was 65° C. and it was operating at 60 rpm. The final composition was removed from the mixer after 2.5 minutes, when the material temperature was between 90°-95° C.

Test specimens of each rubber formulation were prepared by cutting out the required mass from an uncured sheet (about 2.5 mm to 3.81 mm thick), and cured within closed cavity molds under pressure for 15 minutes at 171° C. The test specimens were then subjected to various physical tests, and the results of these tests are reported in Table III. Tensile mechanical properties were measured using ASTM-D 412 at 25° C. Dynamic properties were determined by using a Rheometrics Dynamic Analyzer (RDA). Temperature sweep experiments measured tan δ at a frequency of 31.4 rad/sec using 0.5% strain for temperatures ranging from −100° C. to −10° C., and with 2% strain for temperatures ranging from −10° C. to 100° C. Strain sweep experiments on an RDA were used to obtain ΔG' data, at a frequency of 0.1 Hz (6.2832 rad/sec) and a temperature of 50° C., with strain sweeping from 0.25% to 14%.

The green stock Mooney viscosity measurements were taken at 130° C. The sample was preheated for 1 minute, a large rotor was started, and the torque was measured after 4 minutes of rotation. Curing characteristics were measured using a Monsanto Rheometer MD2000, at a frequency of 1.67 Hz, 160° C., and a strain of 7%. MH and ML are the measured maximum and minimum torques, respectively. T50 is the time required for the torque to reach 50% of the total torque increase during the curing process.

Various modifications and alterations that do not depart from the scope and spirit of this invention will become appar-

What is claimed is:

1. A functionalized elastomer defined by the formula $$\pi\text{-}\theta\text{-}R^3-\underset{\underset{R^2}{|}}{\overset{\overset{R^1}{|}}{C}}-\underset{\underset{OH}{|}}{\overset{\overset{R^7}{|}}{C}}-\underset{\underset{R^5}{|}}{\overset{\overset{R^6}{|}}{C}}-\underset{\underset{R^8}{|}}{N}-R^4-N\underset{H}{\overset{R^9}{\diagup}}$$

where π includes a polymer chain, θ includes a group 14 element, $R^1$ and $R^2$ each independently include hydrogen, or a monovalent organic group, or a polymer chain, $R^3$ and $R^4$ each independently include a divalent organic group or a covalent bond, $R^5$, $R^6$, $R^7$, $R^8$ and $R^9$ each independently include a monovalent organic group or a hydrogen atom.

2. The functionalized elastomer of claim 1, where π is a polymer that has a glass transition temperature that is less than 0° C.

3. The functionalized elastomer of claim 1, where π is a polymer selected from polybutadiene, polyisoprene, poly(styrene-co-butadiene), poly(styrene-co-butadiene-co-isoprene), poly(isoprene-co-styrene), and poly(butadiene-co-isoprene).

4. The functionalized elastomer of claim 1, where the polymer has a number average molecular weight of from about 5 to 1,000 kg/mol.

5. The functionalized elastomer of claim 1, where $R^1$ includes an alkyl group including from 1 to about 10 carbon atoms or an alkoxy group including from 1 to about 10 carbon atoms.

6. The functionalized elastomer of claim 1, where $R^2$ includes an alkyl group including from 1 to about 10 carbon atoms or an alkoxy group including from 1 to about 10 carbon atoms.

7. The functionalized elastomer of claim 1, where $R^3$ includes an alkylene group including from 1 to about 10 carbon atoms.

8. The functionalized elastomer of claim 1, where $R^4$ includes an alkylene group including from 1 to about 10 carbon atoms.

9. The functionalized elastomer of claim 1, where θ is selected from the group consisting of carbon, silicon, germanium, tin, and lead.

10. The functionalized elastomer of claim 1, where θ is silicon or tin.

11. A tire component prepared by a method comprising the steps of:
(i) combining (a) an elastomer including a functionalized elastomer defined by the formula:

$$\pi\text{-}\theta\text{-}R^3-\underset{\underset{R^2}{|}}{\overset{\overset{R^1}{|}}{C}}-\underset{\underset{OH}{|}}{\overset{\overset{R^7}{|}}{C}}-\underset{\underset{R^5}{|}}{\overset{\overset{R^6}{|}}{C}}-\underset{\underset{R^8}{|}}{N}-R^4-N\underset{H}{\overset{R^9}{\diagup}}$$

where π includes a polymer chain, θ includes a group 14 element, $R^1$ and $R^2$ each independently include hydrogen, or a monovalent organic group, or a polymer chain, $R^3$ and $R^4$ each independently include a divalent organic group or a covalent bond, $R^5$, $R^6$, $R^7$, $R^8$ and $R^9$ each independently include a monovalent organic group or a hydrogen atom with (b) a filler to form a first mixture;
(ii) further mixing the first mixture, optionally with additional ingredients, to form an intermediate mixture;
(iii) adding ingredients including a curative to the intermediate mixture to form a vulcanizable mixture; and
(iv) fabricating the vulcanizable mixture into a tire component.

12. A tire comprising the tire component of claim 11.

13. The tire component of claim 11, where said step of combining includes combining a nitrogen-containing heterocycle compound to prepare the first mixture, and where the filler include silica.

14. The tire component of claim 13, where said step of further mixing the first mixture includes adding a silica coupling agent to form the intermediate mixture.

15. The tire component method of claim 13, where the nitrogen-containing heterocycle includes compounds represented by the formula $$\underset{R^{12}}{\overset{R^{11}}{\diagdown}}N\diagdown A$$

where A includes oxygen, sulfur, or N—$R^{13}$, $R^{11}$ is a divalent organic group, $R^{12}$ and $R^{13}$ are independently a hydrogen atom or a monovalent organic group, or where any two or more of $R^{11}$, $R^{12}$, and $R^{13}$ combine to form a multivalent organic group, which results in a multicyclic compound.

16. The tire component of claim 13, where the nitrogen-containing heterocycle includes an imidazole, pyrimidine, thiazole, thiazoline, histadine, purine, adenine, or guanine.

17. The tire component of claim 13, where the vulcanizable mixture comprises from about 0.005 to about 8 parts by weight nitrogen-containing heterocycle per hundred parts functionalized elastomer.

18. The tire component of claim 11, where from about 5 to about 100 percent of the total elastomer is the functionalized elastomer.

19. A method for preparing a tire, the method comprising the steps of:
(i) combining at least one functionalized elastomer, silica, and a nitrogen-containing heterocycle, optionally with additional ingredients, to form a first mixture, where the functionalized elastomer includes a silica-interactive group and a functionality that lowers hysteresis in carbon black formulations;
(ii) cooling the first mixture;
(ii) further mixing the first mixture, optionally with additional ingredients including a silica coupling agent and a silica dispersing agent, to form an intermediate mixture;
(iii) adding ingredients including a curative to the intermediate mixture to form a vulcanizable mixture;
(iv) mixing the vulcanizable mixture;
(v) forming the vulcanizable mixture into a tire component;
(vi) building a tire by including the tire component; and
(vii) curing the tire.

* * * * *